US011938455B2

(12) United States Patent
Lucon et al.

(10) Patent No.: US 11,938,455 B2
(45) **Date of Patent: *Mar. 26, 2024**

(54) CONTINUOUS ACOUSTIC MIXER

(71) Applicant: Resodyn Corporation, Butte, MT (US)

(72) Inventors: Peter Andrew Lucon, Butte, MT (US); Zachary Ruprecht Martineau, Butte, MT (US)

(73) Assignee: Resodyn Corporation, Butte, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/118,846

(22) Filed: Mar. 8, 2023

(65) Prior Publication Data

US 2023/0219047 A1 Jul. 13, 2023

Related U.S. Application Data

(60) Continuation of application No. 17/099,359, filed on Nov. 16, 2020, now Pat. No. 11,623,189, which is a division of application No. 15/695,784, filed on Sep. 5, 2017, now Pat. No. 10,835,880.

(51) Int. Cl.

*B01F 31/00* (2022.01)
*B01F 25/432* (2022.01)
*B01F 31/50* (2022.01)
*B01F 31/80* (2022.01)

(52) U.S. Cl.

CPC ............ *B01F 31/50* (2022.01); *B01F 25/432* (2022.01); *B01F 31/57* (2022.01); *B01F 31/84* (2022.01)

(58) Field of Classification Search

CPC ........ B01F 31/50; B01F 31/57; B01F 25/432; B01F 31/84

See application file for complete search history.

(56) References Cited

U.S. PATENT DOCUMENTS 3,045,984 A 7/1962 Cochran
3,089,824 A 5/1963 Wurster
3,200,567 A 8/1965 May
(Continued)

FOREIGN PATENT DOCUMENTS

CN 103585943 A 2/2014
DE 948820 C 9/1956
(Continued)

OTHER PUBLICATIONS

International Search Report and Written Opinion dated Oct. 24, 2013 in International (PCT) Application No. PCT/US2013/043755.
(Continued)

*Primary Examiner* — Anshu Bhatia
(74) *Attorney, Agent, or Firm* — McDermott Will & Emery LLP

(57) ABSTRACT

A system for continuously processing a combination of materials includes a continuous process vessel having an outlet and one or more inlets. The continuous process vessel is configured to oscillate along an oscillation axis. An acoustic agitator is coupled to the continuous process vessel. The acoustic agitator is configured to oscillate the continuous process vessel along the oscillation axis. An outlet passage is in fluid communication with the outlet. At least a portion of the outlet passage or at least a portion of the continuous process vessel is disposed within a portion of the acoustic agitator.

14 Claims, 8 Drawing Sheets

(56) References Cited

U.S. PATENT DOCUMENTS

| | | | | |
|---|---|---|---|---|
| 3,237,596 | A | | 3/1966 | Grass, Jr. et al. |
| 3,826,740 | A | | 7/1974 | Jewett |
| 4,070,503 | A | | 1/1978 | Robert et al. |
| 4,493,556 | A | * | 1/1985 | Prew ........................ B01F 31/57 366/114 |
| 4,848,673 | A | | 7/1989 | Masuda et al. |
| 5,395,592 | A | | 3/1995 | Bolleman et al. |
| 5,459,318 | A | | 10/1995 | Cacho et al. |
| 5,460,209 | A | | 10/1995 | Jandura et al. |
| 5,473,700 | A | | 12/1995 | Fenner, Jr. |
| 5,836,683 | A | | 11/1998 | Moon et al. |
| 6,244,738 | B1 | | 6/2001 | Yasuda et al. |
| 6,361,747 | B1 | | 3/2002 | Dion et al. |
| 6,607,008 | B1 | | 8/2003 | Yoshimoto et al. |
| 7,188,993 | B1 | | 3/2007 | Howe et al. |
| 2003/0044332 | A1 | | 3/2003 | Conrad et al. |
| 2003/0201562 | A1 | | 10/2003 | Lease et al. |
| 2006/0266967 | A1 | | 11/2006 | Niura |
| 2007/0267351 | A1 | | 11/2007 | Roach et al. |
| 2009/0038932 | A1 | | 2/2009 | Denslow et al. |
| 2010/0096936 | A1 | | 4/2010 | Bae et al. |
| 2012/0121469 | A1 | | 5/2012 | Hiller et al. |

FOREIGN PATENT DOCUMENTS

| | | | |
|---|---|---|---|
| DE | 1063123 | B | 8/1959 |
| EP | 1402939 | A2 | 3/2004 |
| EP | 1972296 | A1 | 9/2008 |
| EP | 2103344 | A1 | 9/2009 |
| EP | 2793221 | A1 | 10/2014 |
| GB | 2056297 | A | 3/1981 |
| JP | S45-2510 | A | 1/1970 |
| JP | S58223429 | A | 12/1983 |
| JP | 63-028434 | A | 2/1988 |
| JP | H07-004834 | A | 1/1995 |
| JP | H07-019728 | A | 1/1995 |
| JP | 10-128094 | A | 5/1998 |
| JP | H11248349 | A | 9/1999 |
| JP | 2000-501651 | A | 2/2000 |
| JP | 2001-293347 | A | 10/2001 |
| JP | 2004-123717 | A | 4/2004 |
| JP | 2004-230272 | A | 8/2004 |
| JP | 2004-337649 | A | 12/2004 |
| JP | 2005-060281 | A | 3/2005 |
| JP | 2008-183168 | A | 8/2008 |
| JP | 2009-277679 | A | 11/2009 |
| JP | 2010-005582 | A | 1/2010 |
| JP | 2010-515565 | A | 5/2010 |
| JP | 2010-539289 | A | 12/2010 |
| JP | 2015-217341 | A | 12/2015 |
| WO | 2008029311 | A1 | 3/2008 |
| WO | 2008103622 | A1 | 8/2008 |
| WO | 2011/058881 | A1 | 5/2011 |
| WO | 2013089239 | A1 | 6/2013 |
| WO | 2015061448 | A2 | 4/2015 |

OTHER PUBLICATIONS

Invitation to Pay Additional Fees and, Where Applicable, Protest Fee mailed Nov. 13, 2013 in International (PCT) Application No. PCT/US2013/054739.

International Search Report and Written Opinion dated Feb. 18, 2014 in International (PCT) Application No. PCT/US2013/054739.

Office Action dated May 18, 2015 in U.S. Appl. No. 13/965,964 (14 pages).

Office Action dated Dec. 14, 2015 in U.S. Appl. No. 13/965,964 (11 pages).

Office Action dated Apr. 7, 2016 in U.S. Appl. No. 13/965,964 (9 pages).

Office Action dated Oct. 6, 2016 in U.S. Appl. No. 13/965,964 (8 pages).

Office Action dated Mar. 8, 2017 in U.S. Appl. No. 13/965,964 (7 pages).

Notice of Allowance dated Jun. 29, 2017 in U.S. Appl. No. 13/965,964 (7 pages).

Restriction Requirement dated May 25, 2017 in U.S. Appl. No. 14/402,505 (8 pages).

Office Action dated Sep. 7, 2017 in U.S. Appl. No. 14/402,505 (6 pages).

Office Action dated Feb. 20, 2018 in U.S. Appl. No. 14/402,505 (7 pages).

Notice of Allowance dated Jul. 18, 2018 U.S. Appl. No. 14/402,505 (7 pages).

Office Action dated Dec. 12, 2017 in European Patent Application No. 13730092.7.

Office Action dated Oct. 5, 2018 in European Patent Application No. 13730092.7.

Office Action dated Feb. 1, 2016 in Japanese Patent Application No. 2015-515268.

Final Office Action dated Dec. 19, 2016 in Japanese Patent Application No. 2015-515268 dated Dec. 19, 2016.

Office Action issued in Japanese Patent Application No. 2015-528520 dated Nov. 14, 2016, and English translation thereof, 6 pages.

Office Action issued in Japanese Patent Application No. 2015-528520 dated Mar. 7, 2016, and English translation thereof, 17 pages.

Notice of Allowance in Japanese Patent Application No. 2015-528520 dated Feb. 6, 2017.

Office Action issued in European Patent Application No. 13753377.4 dated Mar. 7, 2016.

Office Action in European Patent Application No. 13753377.4 dated Feb. 6, 2017.

Thayer, Ann M. "Harnessing Microreactions" Chemical & Engineering News, vol. 83, No. 22, pp. 43-52, May 30, 2005. Retrieved from: https://cen.acs.org/articles/83/i22/HARNESSING-MICROREACTIONS.html.

Corning, Inc. "The future flows through Corning® Advanced-FlowTM Reactors" Brochure 2016. Retrieved from: https://www.corning.com/media/worldwide/Innovation/documents/General%20Brochure_WEB.pdf.

International Search Report and Written Opinion dated Oct. 24, 2018 in International (PCT) Application No. PCT/US2018/047890.

International Search Report and Written Opinion dated Nov. 22, 2018 in International (PCT) Application No. PCT/US2018/047788.

Ex Parte Quayle Office Action dated Nov. 27, 2018 in U.S. Appl. No. 16/157,919.

Notice of Allowance dated May 14, 2019 in U.S. Appl. No. 16/157,919.

Office Action dated Dec. 12, 2019 in U.S. Appl. No. 15/686,784.

Extended European Search Report dated Jun. 17, 2019 in European Patent Application No. 19154132.5.

Office Action dated Jun. 15, 2020 in U.S. Appl. No. 15/686,784.

Notice of Allowance dated Dec. 21, 2022 in U.S. Appl. No. 17/099,359 (7 pages).

* cited by examiner

CONTINUOUS ACOUSTIC MIXER

CROSS REFERENCE TO RELATED APPLICATIONS

This application is a continuation of U.S. application Ser. No. 17/099,359 filed on Nov. 16, 2020, which issued as U.S. Pat. No. 11,623,189, which is a divisional of U.S. patent application Ser. No. 15/695,784 filed on Sep. 5, 2017, which issued as U.S. Pat. No. 10,835,880, the entire contents of which are incorporated by reference herein.

TECHNICAL FIELD

The present description relates generally to processing systems and, more particularly, but not exclusively, to continuous mixers.

BACKGROUND

A continuous acoustic mixer (CAM) is a device that can impart acoustic energy onto one or more materials passing through it. The acoustic energy can mix, react, coat, or combine the materials. The CAM can often process materials more quickly and uniformly than batch mixers. The materials can then be conveyed to one or more downstream processing devices or collection devices.

SUMMARY

According to some aspects of the present disclosure, a system for continuously processing a combination of materials is provided. The system includes a continuous process vessel having an outlet and one or more inlets, and the continuous process vessel is configured to oscillate along an oscillation axis. An acoustic agitator is coupled to the continuous process vessel, and the acoustic agitator is configured to oscillate the continuous process vessel along the oscillation axis, and an outlet passage is in fluid communication with the outlet. At least a portion of the outlet passage or at least a portion of the continuous process vessel is disposed within a portion of the acoustic agitator.

According to some aspects of the present disclosure, a method for continuously processing a combination of ingredients is provided. The method includes providing a continuous process vessel and an acoustic agitator, and the continuous process vessel includes an outlet. The method also includes introducing a first ingredient and a second ingredient to the continuous process vessel, oscillating the continuous process vessel along an oscillation axis using a motive force of the acoustic agitator to produce a mixed material, conveying the mixed material through the outlet and through an outlet passage in fluid communication with the outlet, and disposing at least a portion of the outlet passage or at least a portion of the continuous process vessel within a portion of the acoustic agitator.

Some aspects of the present disclosure provide a system for continuously processing a combination of materials. The system includes a continuous process vessel having an outlet and one or more inlets, and the continuous process vessel is configured to oscillate along an oscillation axis. An acoustic agitator is coupled to the continuous process vessel and configured to oscillate the continuous process vessel along the oscillation axis, and a power supply is configured to provide electrical or mechanical energy to the acoustic agitator. A conveyance means for conveying a mixed material, mixed in the continuous process vessel, through at least a portion of the acoustic agitator.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

The following figures are included to illustrate certain aspects of the present disclosure, and should not be viewed as exclusive implementations. The subject matter disclosed is capable of considerable modifications, alterations, combinations and equivalents in form and function, without departing from the scope of this disclosure.

DETAILED DESCRIPTION

Figure 1:
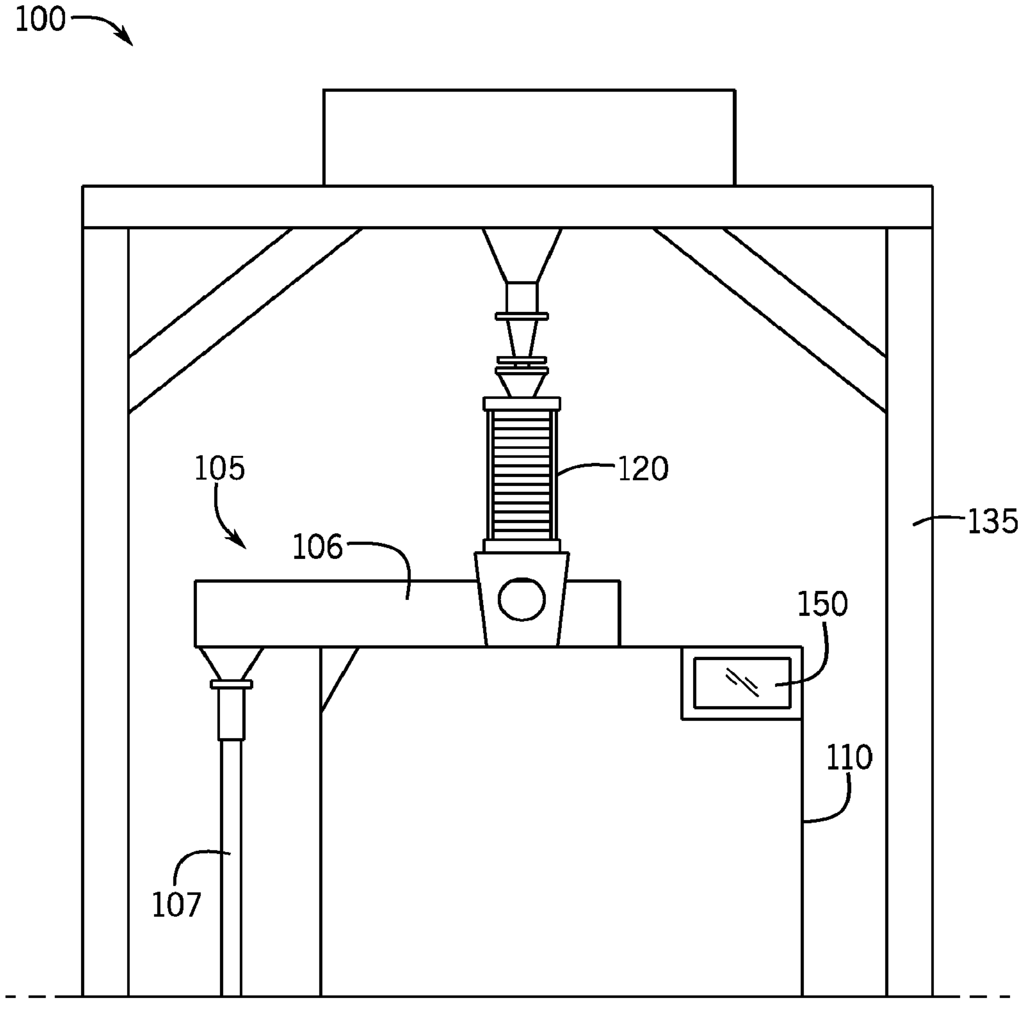
FIG. 1 is perspective view of a continuous acoustic mixer according to exemplary implementations of the present disclosure.

While this disclosure is susceptible of implementations in many different forms, there is shown in the drawings and will herein be described in detail implementations of the disclosure with the understanding that the present disclosure is to be considered as an exemplification of the principles of the disclosure and is not intended to limit the broad aspects of the disclosure to the implementations illustrated.

This disclosure generally relates to a continuous acoustic mixer (CAM). A CAM operates using an acoustic agitator to oscillate a continuous process vessel. The continuous process vessel can include internal structural features configured to transfer the oscillations into process ingredients passing therethrough. The structural features can include plates, wedges, or baffles having angled surfaces that act to impart acceleration forces on the process ingredients. These forces cause mixing and reacting of the process ingredients. In some implementations, the frequency of the oscillations can be relatively low while the acceleration forces can be relatively high. For example, in some implementations, the frequency of the oscillations can be greater than 1 Hz and less than 1 KHz. The acceleration forces can be greater than 1G and up to hundreds of Gs. The relatively low-frequency, high-intensity acoustic energy is used to create a near uniform shear field throughout substantially the entire continuous process vessel, which results in thorough mixing, rapid fluidization, reaction, and/or dispersion of the process ingredients. This process can be referred to as low-frequency acoustic agitation or "LFAA." Operation at such high accelerations can subject the components of the CAM to large mechanical stresses. In some implementations, however, the CAM can operate at or near resonance, which promotes efficient operation.

Turning to the figures, FIG. 1 shows a perspective view of a continuous acoustic mixer 100. It can be seen that a continuous acoustic mixer 100 includes a material flow path 105 leading from a continuous process vessel 120 and around an acoustic agitator 110. A support frame 135 mounts one or more elements of the continuous acoustic mixer 100. In particular, the material flow path 105 includes a substantially horizontal conveyor 106 and a substantially vertical tube 107, each of which is disposed entirely outside of the acoustic agitator 110. Such an arrangement may lengthen the flow path 105, require additional components and/or occupy additional total system volume.

Some implementations of a CAM, such as the CAMs 100*a*-100*c* shown in FIGS. 2-9 include a portion of a mixing flow path passing through a portion of a respective acoustic agitator 110*a*-110*c*, rather than an entirety of the flow path passing around the acoustic agitator 110. Such implementations enable a lower overall system volume and improved CAM system packaging by essentially nesting a portion of the mixing flow path within the respective acoustic agitators 110*a*-100*c*. Such implementations also define a more direct and non-circuitous flow path for the product and/or mixing ingredients to follow. This reduces friction, reduces product congestion and increases system speed. Further, CAM arrangements similar to those shown in CAMS 100*a*-100*c* also may avoid segregation, drying and de-mixing problems, product conveyance issues and can prevent cleaning difficulties that may occur with CAM 100, due to the more circuitous flow path 105. CAMs 100*a*-100*c* also avoid the user of certain conveyors, such as belt conveyors, which can ignite CAM elements or ingredients due to stresses and friction from product conveyance, and vibratory conveyors, which have limited flow rates and require a large angular mounting space.

Figure 2:
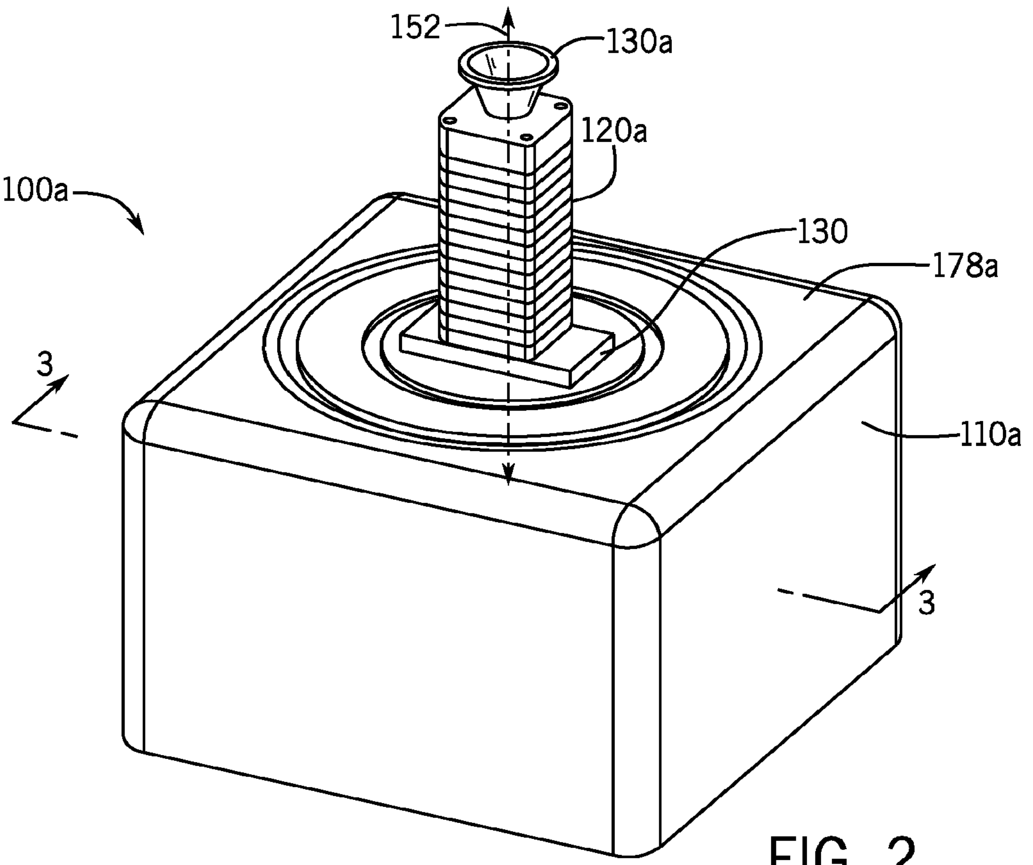
FIG. 2 is a top perspective view of a continuous acoustic mixer according to exemplary implementations of the present disclosure.
Figure 3:
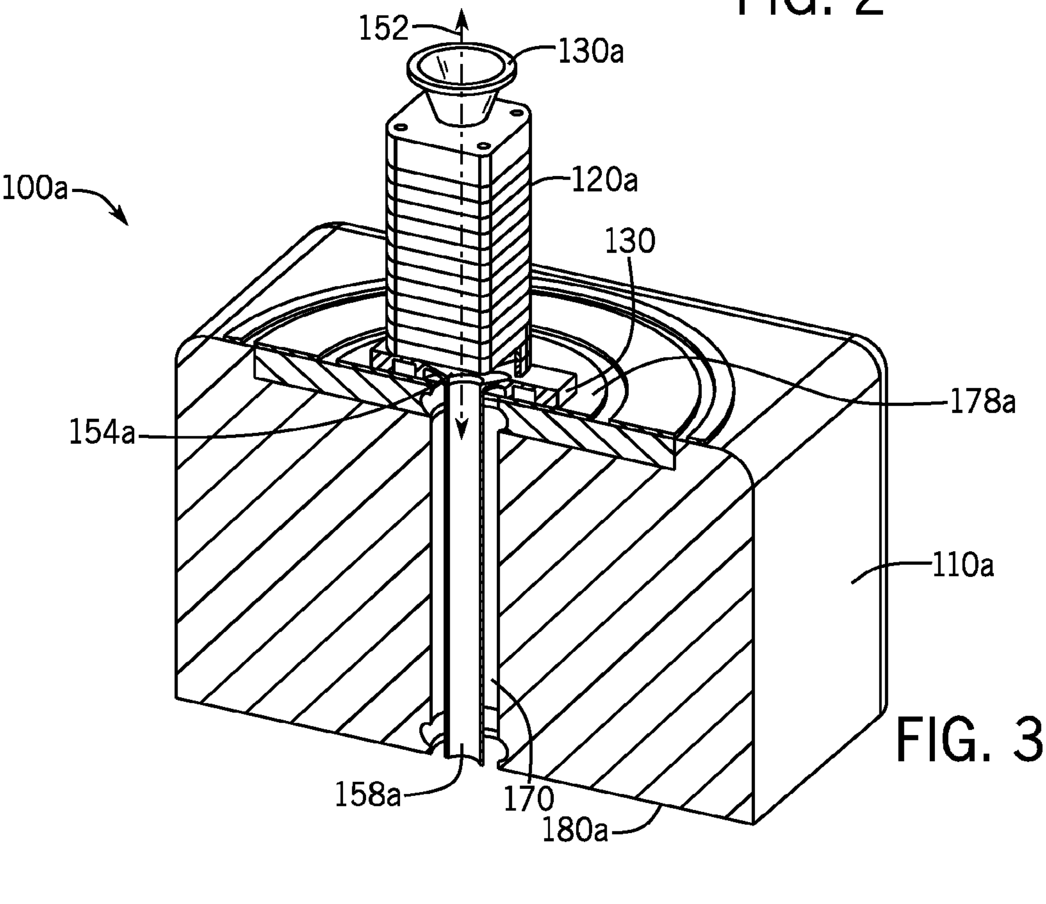
FIG. 3 is a cutaway view of the continuous acoustic mixer of FIG. 2, taken along line 3-3.

FIG. 2 is a top perspective view of a continuous acoustic mixer (CAM) 100*a* according to exemplary implementations of the present disclosure and FIG. 3 is a cutaway view of the continuous acoustic mixer 100*a* of FIG. 2, taken along line 3-3. The CAM 100*a*, in some implementations, continuously processes a combination of materials. The CAM 100*a* can be similar to the continuous processing system disclosed in U.S. Patent Publication Number US 2013/0329514 A1, assigned to Resodyn Corporation of Butte, Mont., USA, the entirety of which is incorporated herein by reference. The CAM 100*a* includes a continuous process vessel 120*a* coupled to an acoustic agitator 110*a*. The continuous process vessel 120*a* can be coupled to the acoustic agitator 110*a* with a fastener 130. The acoustic agitator 110*a* receives electrical power from an electrical cabinet 150, as illustrated in FIG. 1. The continuous process vessel 120*a* can include a first inlet 130*a* configured to receive at least a first process ingredient and in some implementations a second inlet 130*b* configured to receive at least a second process ingredient. The second inlet 130*b* can be seen in subsequent figures, as will be described below. In some implementations, multiple process ingredients can be pre-mixed and then received by the first inlet 130*a*. Further, the first inlet 130*a* can receive the first and second process ingredients simultaneously, or substantially simultaneously. The continuous process vessel 120*a* includes an outlet 154*a* for discharging a product of the mixed ingredients subsequent to the ingredients passing through at least a portion of the continuous process vessel 120*a*.

The acoustic agitator 110*a* can be a modified Resonant Acoustic Mixer (RAM), which is available from Resodyn Corporation of Butte, Mont. In some implementations, the acoustic agitator 110*a* agitates the continuous process vessel 120*a* with a peak-to-peak displacement between 0.125 inches 1.5 inches, inclusive. In some implementations, the acoustic agitator 110*a* agitates the continuous process vessel 120*a* with an acceleration between 1G and 200Gs, inclusive. In some implementations, the acoustic agitator 110*a* agitates the continuous process vessel 120*a* at a frequency between 1 Hz and 1 KHz, inclusive. In some implementations, the acoustic agitator 110*a* agitates the continuous process vessel 120*a* at a frequency between 10 Hz and 100 Hz, inclusive. In some implementations, the acoustic agitator 110*a* agitates the continuous process vessel 120*a* at a frequency of approximately 60 Hz. The acoustic agitator 110*a* can cause the oscillation of the continuous process vessel 120*a* along an oscillation axis 152. The oscillation axis 152, in some implementations, is oriented substantially in parallel with a direction of a gravitational force. In some implementations, the oscillation axis 152 is oriented substantially perpendicular to the direction of the gravitational force. In some implementations, the oscillation axis 152 is oriented neither substantially perpendicular to, nor substantially in parallel with, the direction of the gravitational force.

The continuous process vessel 120*a* is disposed substantially, or entirely, adjacent the acoustic agitator 110*a*. The continuous process vessel 120*a* is attached, or releasably attached, to the acoustic agitator 110*a* by the fastener 130. Product passes through the outlet 154*a* disposed on a lower and/or outer portion of the continuous process vessel 120*a* following processing in the continuous process vessel 120*a*. An outlet passage 158*a*, in fluid communication with the outlet 154*a*, is visible in FIG. 3. The product, in some implementations, passes from the continuous process vessel 120*a*, through the outlet 154*a* and subsequently through the outlet passage 158*a*.

A cavity 170 is formed in the acoustic agitator 110*a*. The cavity 170 may be of any size, shape or form. As shown in FIG. 3, the cavity 170 extends through the acoustic agitator 110*a* from a first surface 178*a*, e.g., an upper surface, of the acoustic agitator 110 to a second surface 180*a*, e.g., a lower surface, of the acoustic agitator 110*a*. The outlet passage 158*a*, in some implementations, is disposed entirely or substantially entirely within the cavity 170. In some implementations, the outlet passage 158*a* is disposed partially within the cavity 170. In some implementations, the outlet passage 158*a* extends from the first surface 178*a* to the second surface 180*a*, or substantially from the first surface 178*a* to the second surface 180*a*.

Figure 4:
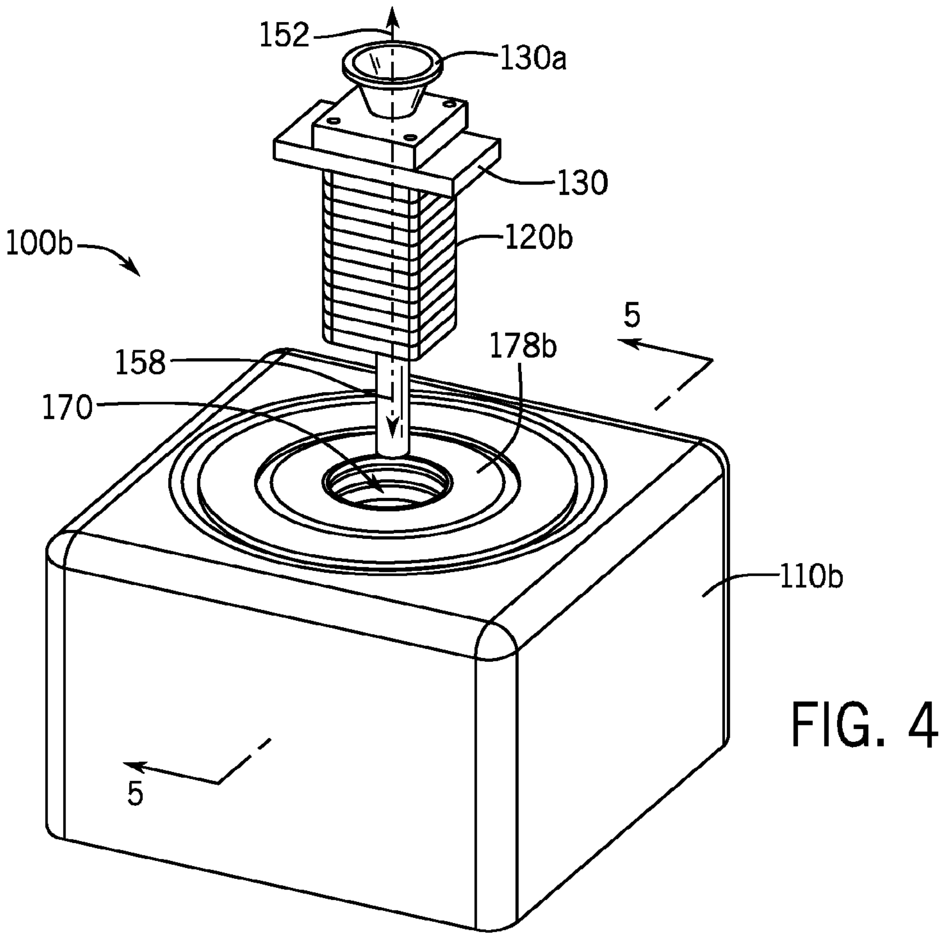
FIG. 4 is a top perspective view of another implementation of a continuous acoustic mixer according to exemplary implementations of the present disclosure showing a continuous process vessel removed from an acoustic agitator.
Figure 5:
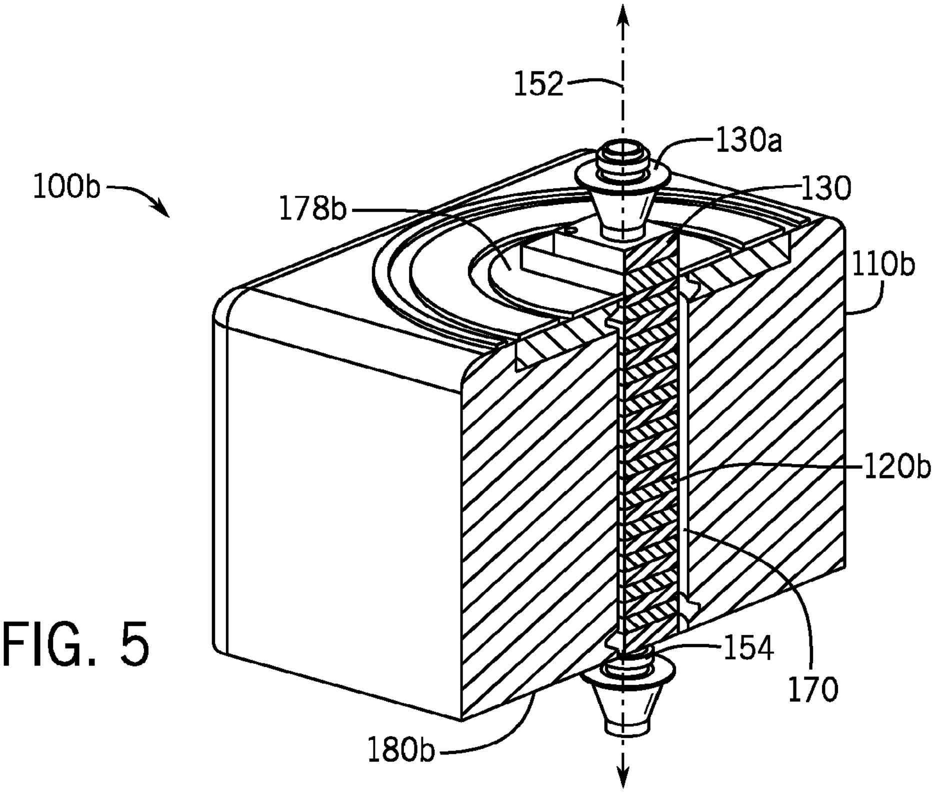
FIG. 5 is a cutaway view of the continuous acoustic mixer of FIG. 4, taken along line 5-5 showing the continuous process vessel inserted into the acoustic mixer.

Turning to FIGS. 4 and 5, FIG. 4 is a top perspective view of another implementation of a continuous acoustic mixer 100*b* according to exemplary implementations of the present disclosure, and FIG. 5 is a cutaway view of the continuous acoustic mixer 100*b* of FIG. 4, taken along line 5-5. In comparison to implementations shown in FIGS. 2 and 3, the continuous process vessel 120*b* of FIGS. 4 and 5 is located within the acoustic agitator 110*b*. Lateral loads created by the mixing of ingredients in the continuous process vessel 120*a* of the implementations shown in FIGS. 2 and 3 may create moment loads in the acoustic agitator 110*a* and other elements of the continuous acoustic mixer 100. Locating the continuous process vessel 120*b* within the acoustic agitator 110*b* reduces an effective lever arm caused by lateral movement within the continuous process vessel 120*b*, thereby reducing the loads and moment caused by the lateral movement. Avoiding or reducing these loads and moments increases an operating capacity of the continuous acoustic mixer 100*b*. Further, as will be described below, ingredient de-mixing is reduced due to a shorter distance between the continuous process vessel 120*b* and a receptacle into which the product of the mixing is received, such as the collection device 210 shown in FIG. 9. This direct deposition of mixed materials into a receiving vessel, collection device 210, or final mold shape also accommodates requirements for the mixing and transport of hazardous material, such as explosives, propellants and/or pyrotechnics that may be hazardous (to both infrastructure and personnel safety), safely conveying the product of such mixing directly from the mixer to its destination. Direct conveyance also avoids the hazards and increased cleaning costs and time associated with the use of intervening conveyance systems.

As indicated above, FIGS. 4 and 5 show an implementation of a continuous acoustic mixer 100*b* in which the continuous process vessel 120*b* is disposed substantially, or entirely, within the cavity 170 of the acoustic agitator 110*b*. The continuous process vessel 120*b* can also be disposed partially within the cavity 170. In some implementations, the continuous process vessel 120*b* extends from a first surface 178*b* of the acoustic agitator 110*b* to a second surface 180*b* of the acoustic agitator 110*b*, or substantially from the first surface 178*b* to the second surface 180*b*. In some implementations, the continuous process vessel 120*b* is partially or fully disposed within the cavity 170 and the outlet passage 158*b* is also partially or fully disposed within the cavity 170.

Figure 6:
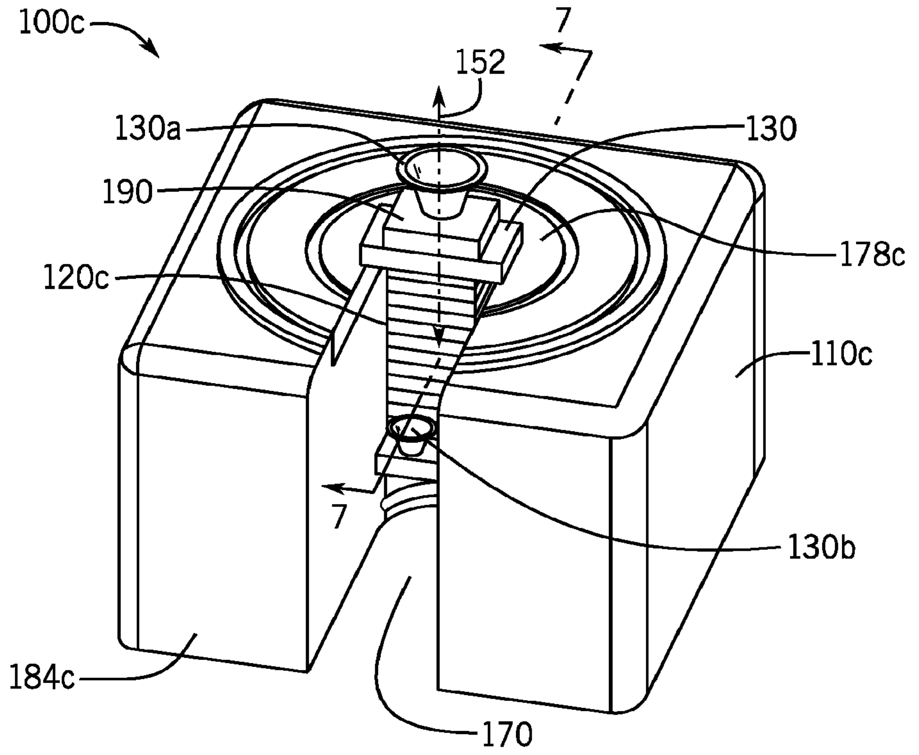
FIG. 6 is a top perspective view of another implementation of a continuous acoustic mixer according to exemplary implementations of the present disclosure.
Figure 7:
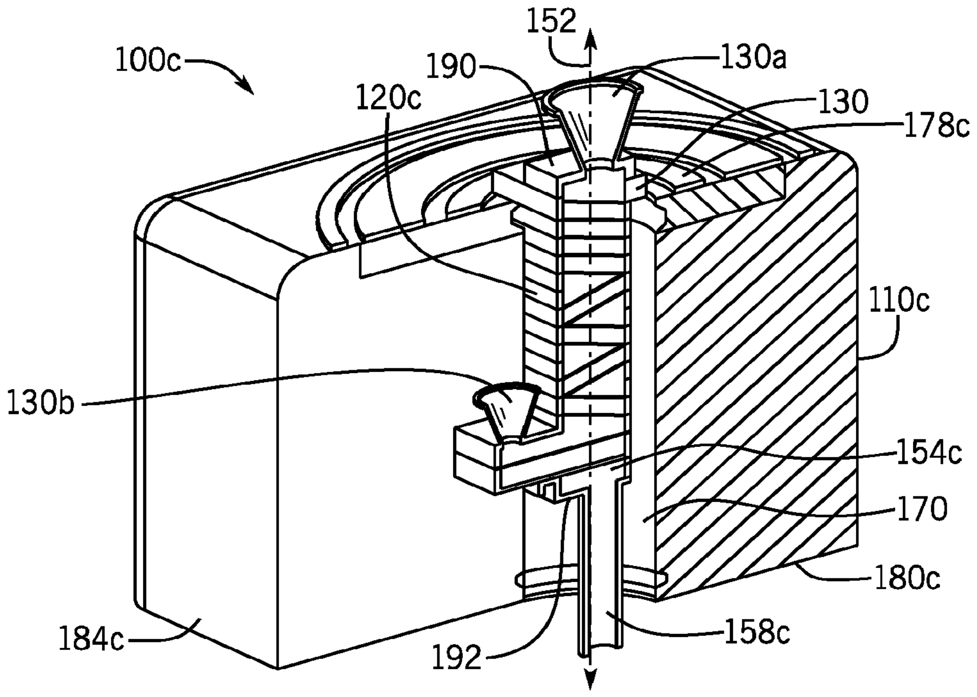
FIG. 7 is a cutaway view of the continuous acoustic mixer of FIG. 6, taken along line 7-7.

Turning to FIGS. 6 and 7, FIG. 6 is a top perspective view of another implementation of the continuous acoustic mixer 100*c* according to exemplary implementations of the present disclosure and FIG. 7 is a cutaway view of the continuous acoustic mixer 100*c* of FIG. 6, taken along line 7-7. In the implementation shown in FIGS. 6 and 7, the acoustic agitator 110*c* is substantially U-shaped or "U" shaped. As described above with reference to FIGS. 4 and 5, the continuous process vessel 120*c* is located within the acoustic agitator 110*c*. Thus, lateral loads created by the mixing of ingredients in the continuous process vessel 120*c* that may limit an operating capacity of the continuous acoustic mixer 100*c* can be reduced or avoided. Further, ingredient de-mixing is reduced due to a shorter distance between the continuous process vessel 120*c* and a collection device 210. As additional benefits, the continuous process vessel 120*c* of FIGS. 6 and 7 can be introduced and/or removed laterally from the acoustic agitator 110*c*, requiring less overhead space to maneuver the continuous process vessel 120*c* into and out of the acoustic agitator 110*c*, and the second inlet 130*b* can be more readily located at various points along a side of the continuous process vessel 120*c*. Further, equipment investment and maintenance costs are reduced.

As shown in FIGS. 6 and 7, the cavity 170 formed in the acoustic agitator 110*c* can extend towards, and/or open on, three different surfaces of the acoustic agitator 110*c*. In particular, it can be seen at least in FIG. 7 that the cavity 170, extends towards, and opens on, a first surface 178*c* (i.e., an upper surface), a second surface 180*c* (i.e., a lower surface) and a third surface 184*c* (i.e., a side surface) of the acoustic agitator 110*c*.

As described above, the continuous process vessel 120*c* can be disposed substantially, or entirely, within the cavity 170 of the acoustic agitator 110*c*. The continuous process vessel 120*c* can also be disposed partially within the cavity 170, as shown in FIGS. 6 and 7. The outlet passage 158*c* can also be partially or fully disposed within the cavity 170.

In some implementations, as shown in FIGS. 6 and 7, the second inlet 130*b* can be disposed along a length of the continuous process vessel 120*c*. In particular, the second inlet 130*b* can be disposed at a location between a first vessel end 190 and a second vessel end 192, while the first inlet 130*a* can be disposed substantially at the first vessel end 190. In some implementations, the second inlet 130*b* is disposed closer to the outlet 154*c* than to the first vessel end 190. In some implementations, the second inlet 130*b* is disposed closer to the first inlet 130*a* than to the second vessel end 192 of the continuous process vessel.

Figure 8:
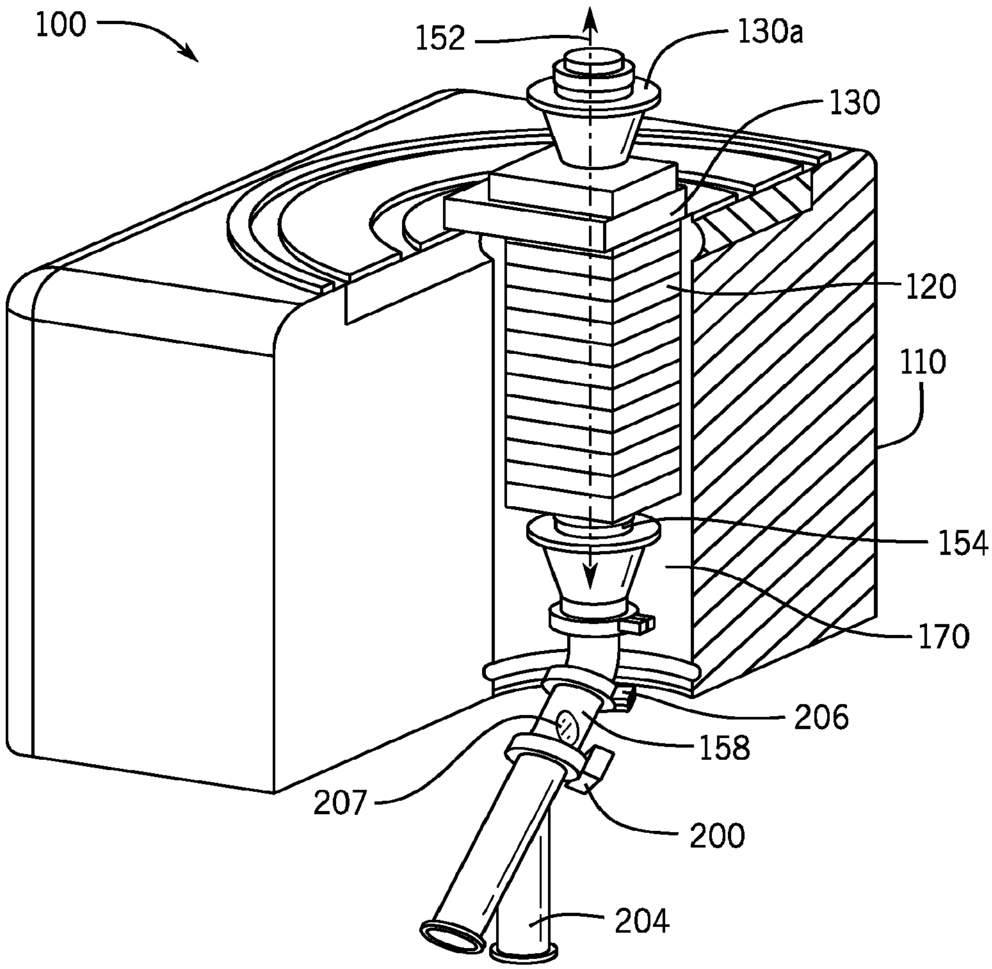
FIG. 8 is a top perspective view of a continuous acoustic mixer according to exemplary implementations of the present disclosure, showing aspects of an outlet passage.
Figure 9:
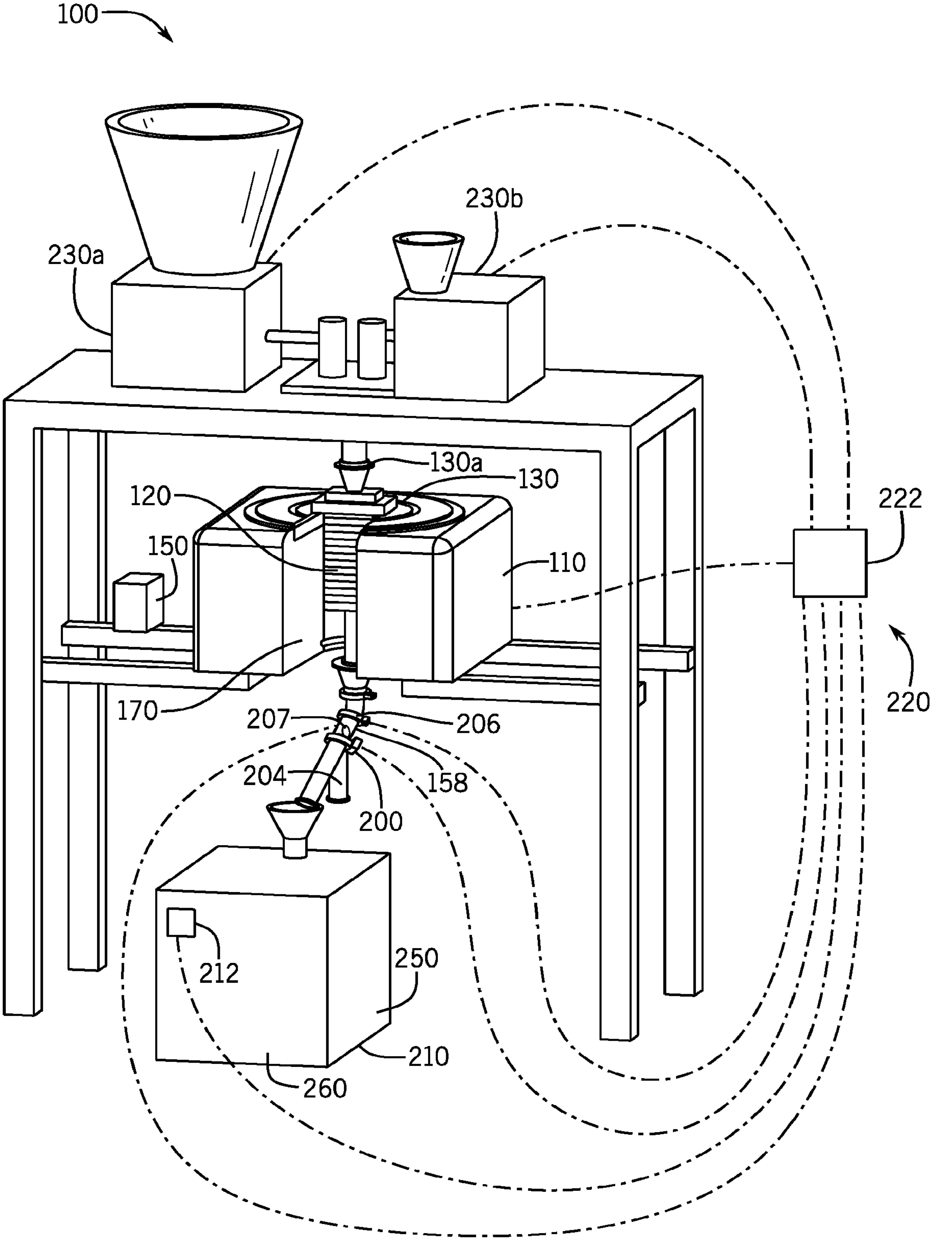
FIG. 9 is a perspective view of a continuous acoustic mixer according to exemplary implementations of the present disclosure, further showing aspects of a collection device.

FIG. 8 is a top perspective cutaway view of the continuous acoustic mixer 100*c* according to exemplary implementations of the present disclosure, showing aspects of an outlet passage 158. FIG. 9 is another perspective view of the continuous acoustic mixer 100*c* according to exemplary implementations of the present disclosure, further showing aspects of a collection device 210. Process analytical technologies (PAT) can be used to monitor a degree of mixing of the ingredients by the continuous acoustic mixer 100*c*. One or more sensors 206 or viewing windows 207 in the outlet passage 158 can sense the degree of ingredient mixing and compare the degree of mixing to a threshold value. When the sensed degree of mixing is at or above the threshold value, a diverter valve 200 allows the mixed ingredients, or product, to continue down the outlet passage 158, and possibly towards the collection device 210. However, when the sensed degree of mixing is below the threshold value, the diverter valve 200 redirects the mixed ingredients, or product, down a diverter outlet 204. The diverter outlet 204 leads away from the continuous acoustic mixer 100*c*, to a refuse collector, to a recycling collector or to another location. In some implementations, if the diverter valve 200 fails, product or mixed ingredients will be sent to the diverter outlet 204 rather than be allowed to continue along the outlet passage 158.

Turning to FIG. 9, a level sensor 212 can be disposed on the collection device 210 and can sense a fill level of the collection device 210. One or more feeders 230*a* and 230*b* are configured to feed one or more ingredients into the continuous process vessel 120. A control system 220, including a controller 222, may monitor and/or influence one or more of the level sensor 212, diverter valve 200, feeders 230*a* and 230*b* and acoustic agitator 110*c*.

In particular, the control system 220 senses a fill level of the collection device 210 using the level sensor 212. Based on the sensed fill level, the control system 220 commands an increase, decrease or no change in a rate of one or more ingredients being supplied from one or more of the feeders 230*a* and 230*b* into the continuous process vessel 120*c*. In some implementations, the feeders 230*a* and 230*b* are controlled by the control system 220 to increase, decrease or maintain a rate of one or more ingredients being supplied into the continuous process vessel 120*c* to keep the fill level within a particular range. In some implementations, the control system 220 commands the diverter valve 200 to redirect the mixed ingredients, or product, down the diverter outlet 204 when the fill level is above, below or at a given threshold value or range. In some implementations, the control system 220 commands the feeders 230*a* and 230*b* to increase, decrease or maintain a rate of one or more ingredients being supplied into the continuous process vessel 120*c* and/or commands the diverter valve 200 to redirect the mixed ingredients, or product, down the diverter outlet 204 depending on characteristics of the collection device 210, which will be discussed below in further detail.

The collection device 210 collects mixed ingredients, or product, exiting the outlet passage 158. The collection device 210 may be a drum, storage container or any other type of device for collecting and/or storing the product. The collection device 210 can also be a processing device 250 designed to further process the product. Examples of such a processing device 250 include a pill press, a tablet press, a capsule maker, a granulator, a mill, a hot-melt extrusion device and/or a drying device. Further, the product can directed, from the outlet passage 158 directly into an end-use device 260, which is a device in which the product will be used without further storing, processing or transporting. Examples of such an end-use device 260 include a rocket motor, flare, grenade, ammunition, bomb and/or a degassing chamber.

Figure 10A:
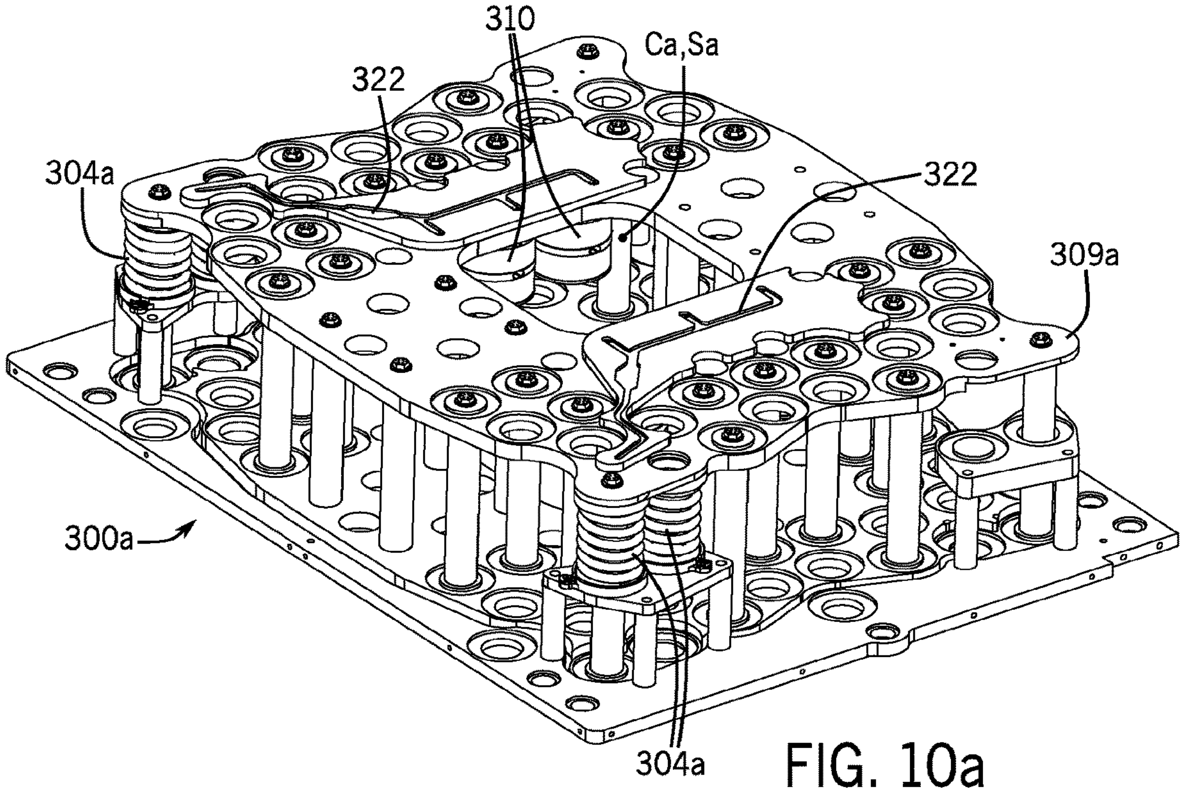
FIG. 10*a* is a perspective view of features of a drive system of an acoustic agitator, according to exemplary implementations of the present disclosure.
Figure 10B:
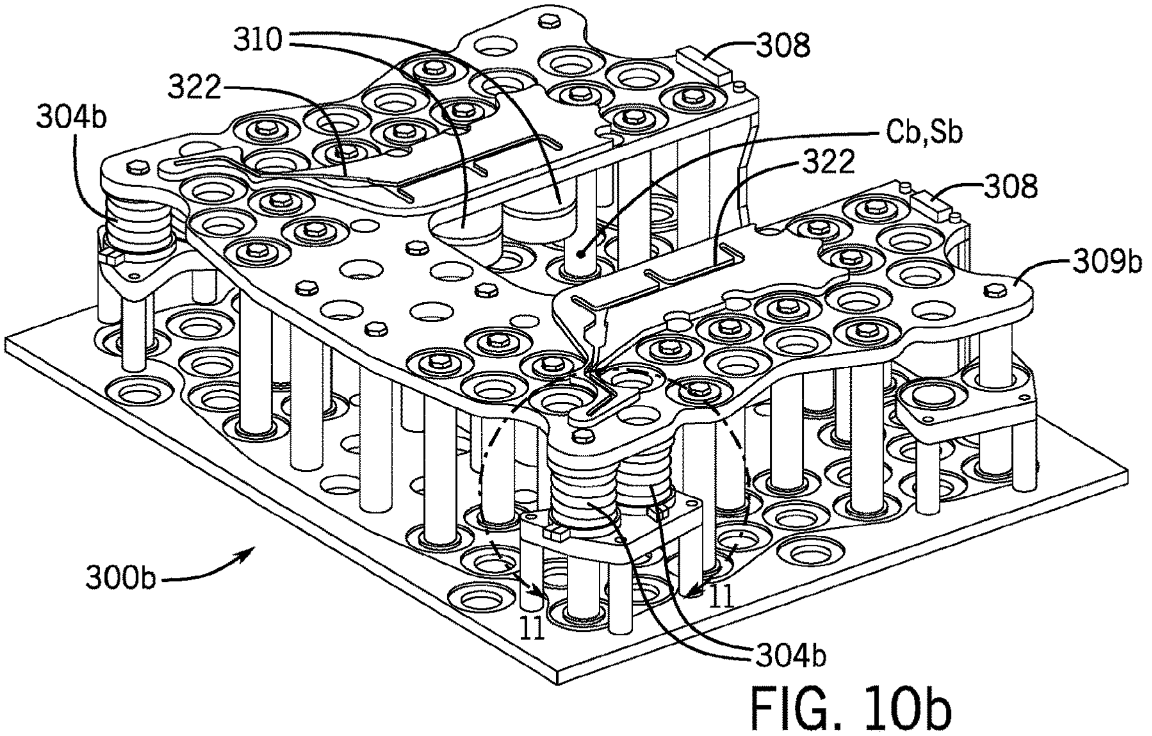
FIG. 10*b* is a perspective view of features of a drive system of an acoustic agitator, according to another exemplary implementation of the present disclosure.
Figure 11:
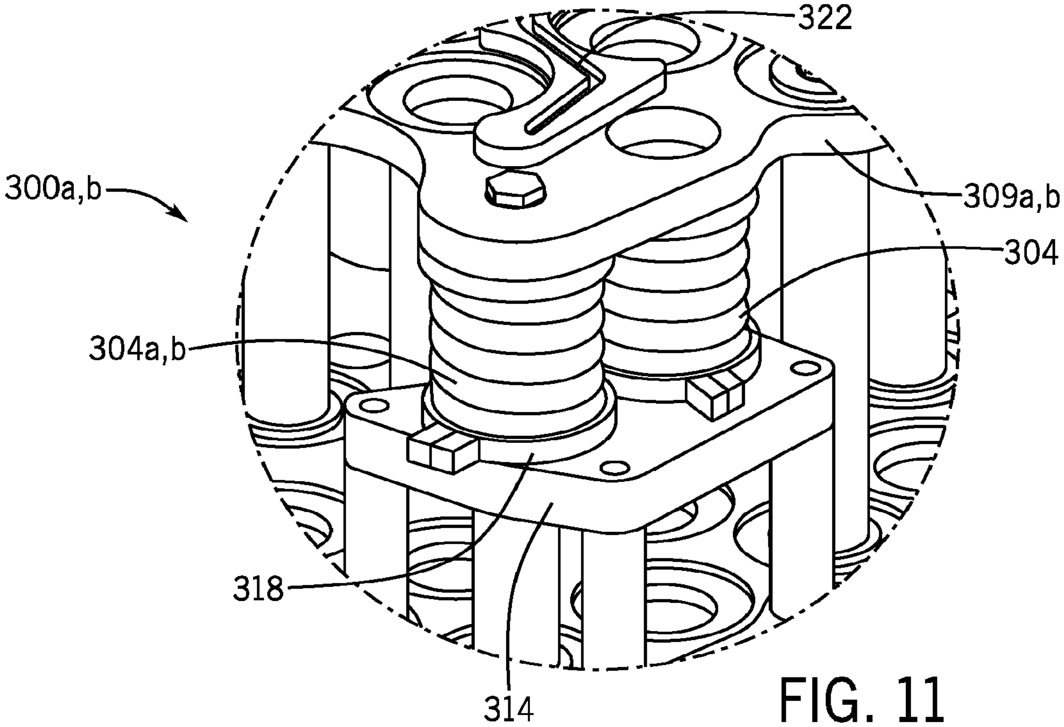
FIG. 11 is a perspective view of features of the drive system of FIGS. 10*a* and 10*b*.

FIG. 10A is a perspective view of features of a drive system 300*a* of an acoustic agitator 110 according to exemplary implementations of the present disclosure, FIG. 10B is a perspective view of features of a drive system 300*b* of an acoustic agitator 110*c* according to another exemplary implementation of the present disclosure and FIG. 11 is a perspective view of features of the drive system 300*a* or 300*b* of FIGS. 10A and 10B. Turning to FIGS. 10A, 10B and 11, the drive systems 300*a* and 300*b* includes one or more springs 304*a* and 304*b*, balancing masses 308, electric motors 310, insulators 314, conductive spring seats 318 and electrical channels 322. The motors 310 are, in some implementations, linear electric motors or voice coil actuators.

In general, the electric motors 310 produce linear motions that generate the oscillation force, and/or a linear force, that is then transmitted to the continuous process vessels 120*a*-120*c* disclosed herein. Turning to FIG. 10A, elements of the drive system 300*a*, such as an upper plate 309*a* are substantially radially symmetric about a center of mass Ca of the drive system 300*a*, and the center of mass Ca of the drive system 300 and a center of spring forces Sa of the drive system are vertically-aligned, or are located or at the same point in space, due to the radial symmetry.

Turning to FIG. 10B, it can be seen that elements of the drive system 300*b*, such as the upper plate 309*b*, have a '"U" shape.' That is, elements of the drive system 300*b* and/or the upper plate 309*b*, are not radially-symmetric about a center of mass Cb of the drive system 300*b*. The radial asymmetry of the shape of the upper plate 309*b* and the resulting separate and non-aligned centers of mass Cb and spring forces Sb may cause system imbalances and adverse resonance during drive system 300*b* operations.

In order to stabilize and balance the drive system 300*b* during operations and oscillations of the drive system 300*b*, spring constants of springs 304*b* are altered and balancing masses 308 can be added to the upper plate 309*b* such that a center of mass Cb of the drive system 300*b* and a center of spring forces Sb of the drive system 300*b* are vertically-aligned or are located at the same point in space. In particular, the drive system 300*b* can include a plurality of spring 304*b* types having different spring constants, or spring forces. As will be understood by one skilled in the art, these springs having different spring constants or spring forces can be arranged to cause the center of mass Cb of the drive system 300*b* and the center of spring forces Sb of the drive system 300*b* to be vertically-aligned or be located at the same point in space. Further, a number or position of springs of the springs 304*b* may be altered to achieve the same effect. For example, springs 304*b* proximate the open end of the "U" shape of the drive system 300*b* may have decreased spring constants to move the center of mass Cb of the drive system 300*b* and the center of spring forces Sb of the drive system 300*b* into vertical alignment or to be located in the same point in space. It is to be understood that "vertically-aligned" as used with respect to Cb and Sb refers to alignment along the oscillation axis 152.

In some implementations, one or more balancing masses 308 are arranged on various components of the drive system 300*b*, for example on an upper plate 309*b*, to cause the center of mass Cb of the drive system 300*b* and the center of spring force Sb of the drive system 300*b* to be vertically-aligned or to be located at the same point in space. For example, the balancing masses 308 may be disposed proximate the open end of the "U" shape of the drive system 300*b*, for example on the upper plate 309*b*.

In some implementations, the drive system 300*b* uses a combination of balancing masses 308 and a plurality of spring 304*b* types having different spring numbers, constants, locations, or spring forces, to cause the center of mass Cb of the drive system 300*b* and the center of spring forces Sb of the drive system 300*b* to be vertically-aligned or to be located at the same point in space.

Figure 10C:
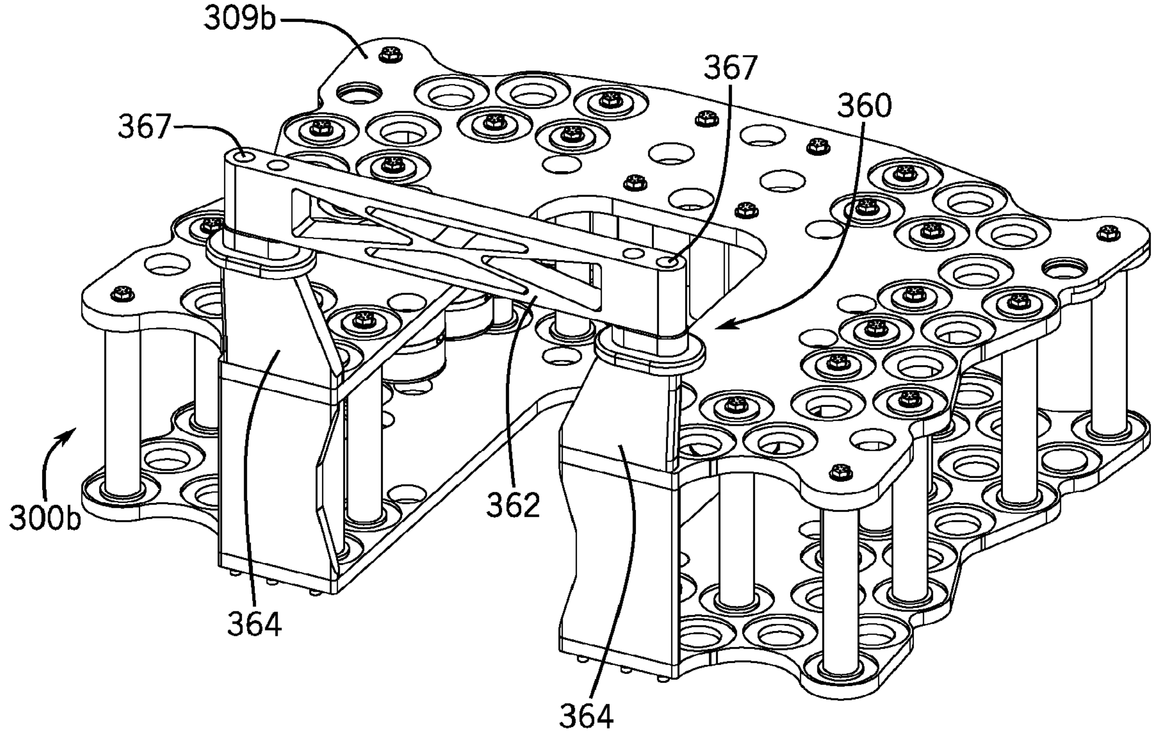
FIG. 10*c* is a perspective view of the drive system of FIG. 10*b*, further showing a reinforcing structure.

Turning to FIG. 10*c*, the drive system 300*b* and/or upper plate 309*b* includes a reinforcing structure 360. The reinforcing structure 360 connects the cantilevered ends of the "U"-shaped upper plate 309*b*. More particularly, the reinforcing structure 360 bridges portions of the upper plate 309*b* across the open area of the drive system 300*b* formed by the "U" shape. The reinforcing structure 360 can strengthen the drive system 300*b* and mitigate unwanted torsional or twisting forces generated by resonance or operational modes of the drive system 300*b*.

In some implementations, the reinforcing structure 360 includes a bridge 362, one or more bridge supports 364 and one or more mechanical fasteners 367. The mechanical fasteners 367 releasably secure the bridge 362 to the bridge supports 364. The bridge supports 364 are, in some implementations, fixedly attached to ends of the upper plate 309*b*. The mechanical fasteners 367 can be any conventional fastening technology known to those skilled in the art, such as nuts and bolts, pins, clamps, etc. In this manner, the bridge 362, mechanical fasteners 367 and bridge supports 364 form the reinforcing structure 360, thereby adding structural strength to the drive system 300*b*. Further, as the bridge 362 is releasably attached to the bridge supports 364 and thus to the upper plate 309*b*, the bridge 362 can be removed from the upper plate 309*b* and/or from the drive system 300*b* to facilitate the insertion and removal of the continuous process vessel 120*c* from the acoustic agitator 110*c* through the opening formed by the "U" shape.

In operation, electrical power is provided to the motors 310 of the drive systems 300*a* and 300*b*. In some implementations, as best illustrated in FIG. 11, electrical power is brought to a conductive spring seat 318, which is insulated from other elements of the drive system 300*a* or 300*b*, such as the upper plate 309*a* or 309*b*, via an insulator 314. The electrical power is electrically conveyed to the spring 304*a* and 304*b*, which is electrically-conductive. The electrical power travels up the spring 304*a* and 304*b* to the electrical channel 322, which includes an electrically-conductive portion. Finally, the electrical power is conveyed from the electrical channel 322 to the motor 310 to thereby generate the oscillation force. Such an arrangement allows a reduced number of components and a simplified design while removing the risk of broken flexible electrical connectors.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A system for continuously processing a combination of materials, the system comprising:

a continuous process vessel having an outlet and one or more inlets, the continuous process vessel configured to oscillate along an oscillation axis, wherein the oscillation axis is oriented parallel with a direction of a gravitational force;

an acoustic agitator coupled to the continuous process vessel, the acoustic agitator configured to oscillate the continuous process vessel along the oscillation axis; and an outlet passage in fluid communication with the outlet, wherein at least a portion of the outlet passage or at least a portion of the continuous process vessel is disposed within a portion of the acoustic agitator, wherein the acoustic agitator comprises a cavity extending through the agitator from a first surface to a second surface, and wherein the at least a portion of the outlet passage or the continuous process vessel is disposed within a portion of the cavity.

2. The system of claim 1, wherein the continuous process vessel is disposed substantially within the acoustic agitator.

3. The system of claim 1, wherein the continuous process vessel extends from a first surface of the acoustic agitator to a second surface of the acoustic agitator.

4. The system of claim 1, wherein the outlet passage extends from a first surface of the acoustic agitator to a second surface of the acoustic agitator.

5. The system of claim 1, wherein the acoustic agitator has a "U" shape.

6. The system of claim 5, wherein the acoustic agitator includes springs having different spring constants, the springs having different spring constants causing a center of mass of the system and a center of spring force of a drive system within the acoustic agitator to be vertically aligned or to be located at a same point in space.

7. The system of claim 5, wherein the acoustic agitator includes one or more balancing masses, the one or more balancing masses causing a center of mass of the system and a center of spring force of a drive system within the acoustic agitator to be vertically aligned or to be located at a same point in space.

8. The system of claim 5, wherein a reinforcing structure comprising a bridge connects cantilevered ends of the acoustic agitator formed by the "U" shape.

9. The system of claim 1, wherein electrical power travels across at least a portion of a spring of the acoustic agitator.

10. The system of claim 9, wherein the electrical power, after travelling across at least a portion of the spring, travels across at least a portion of an electrical channel formed on an upper plate of a drive system within the acoustic agitator before reaching an electric motor.

11. The system of claim 1, wherein the outlet passage conveys the materials to one or more of an end-use device, a processing device or a collection device.

12. The system of claim 1, wherein the acoustic agitator agitates the continuous process vessel at a frequency between 1 Hz and 1 kHz, inclusive.

13. The system of claim 1, wherein the acoustic agitator is configured to oscillate the continuous process vessel at or near resonance.

14. The system of claim 1, wherein continuous process vessel comprises a plurality of plates, wedges, or baffles comprising surfaces that are angled with respect to the oscillation axis.

* * * * *